(12) United States Patent
Ramalingam (10) Patent No.: US 11,658,892 B2
(45) Date of Patent: May 23, 2023

(54) PING LATENCY OPTIMIZATION (71) Applicant: MAVENIR NETWORKS, INC., Richardson, TX (US)

(72) Inventor: Manoharan Ramalingam, Bengaluru (IN)

(73) Assignee: Mavenir Networks, Inc., Richardson, TX (US)

( * ) Notice: Subject to any disclaimer, the term of this patent is extended or adjusted under 35 U.S.C. 154(b) by 185 days.

(21) Appl. No.: 17/159,382

(22) Filed: Jan. 27, 2021

(65) Prior Publication Data

US 2021/0306241 A1 Sep. 30, 2021

Related U.S. Application Data

(60) Provisional application No. 63/002,592, filed on Mar. 31, 2020.

(51) Int. Cl.
| | |
|---|---|
| *G06F 15/173* | (2006.01) |
| *H04L 43/0817* | (2022.01) |
| *H04L 43/0864* | (2022.01) |
| *H04L 43/0888* | (2022.01) |
| *H04W 72/04* | (2023.01) |
| *H04W 84/12* | (2009.01) |

(52) U.S. Cl.
CPC ...... *H04L 43/0817* (2013.01); *H04L 43/0864* (2013.01); *H04L 43/0888* (2013.01); *H04W 72/042* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2014/0023012 A1* | 1/2014 | Sato | H04B 7/04 370/329 |
| 2015/0289289 A1* | 10/2015 | Qian | H04W 72/1284 370/329 |
| 2015/0358247 A1 | 12/2015 | Li | |

(Continued)

FOREIGN PATENT DOCUMENTS

KR 20170089097 A 8/2017

OTHER PUBLICATIONS

Extended European Search Report for corresponding application EP 21 15 5591, 10 pages, dated Aug. 4, 2021.

*Primary Examiner* — Brian Whipple
*Assistant Examiner* — Gregory P Tolchinsky
(74) *Attorney, Agent, or Firm* — Ruggiero, McAllister & McMahon LLC (57) ABSTRACT

A method of reducing the Packet Internet Grope (PING) latency, e.g., in 5G New Radio (NR) or LTE system, is provided. When first two PING requests are received from a user equipment (UE) in uplink (UL), the UE will use Scheduling Request (SR) and Buffer Status Report (BSR) cycle to obtain UL grants for the first two PING requests. Starting from the third PING request, the size of the proactive allocation window for giving UL allocation to the PING request is uniquely configured, using a "delay timer" and a "proactive allocation window." The delay timer is to delay the start of the proactive allocation window from the transmission time interval (TTI) in which the packet type is detected. The proactive allocation window is the number of TTIs over which the proactive allocations are given to a UE.

1 Claim, 3 Drawing Sheets

(56) References Cited

U.S. PATENT DOCUMENTS

| | | | |
|---|---|---|---|
| 2017/0019918 A1* | 1/2017 | Voigt | H04W 72/1289 |
| 2017/0127433 A1* | 5/2017 | Lin | H04W 72/12 |
| 2018/0167842 A1* | 6/2018 | Bergström | H04W 28/0278 |
| 2019/0075589 A1* | 3/2019 | Jeon | H04L 1/1819 |
| 2020/0068601 A1* | 2/2020 | Wang | H04W 72/1221 |

* cited by examiner

PING LATENCY OPTIMIZATION

CROSS-REFERENCE TO RELATED APPLICATIONS

The present application claims the benefit of U.S. Provisional Patent Application No. 63/002,592, filed on Mar. 31, 2020, which is incorporated by reference herein in its entirety.

BACKGROUND OF THE DISCLOSURE

1. Field of the Disclosure

The present disclosure relates to systems and methods for improving network latency for Radio Access Networks (RANs), and relates more particularly for $4^{th}$-Generation (4G) and $5^{th}$-Generation (5G) based mobile networks.

2. Description of the Related Art

Network communication latency characteristics, which are measured using Transmission Control Protocol (TCP) application latency and Packet Internet Grope (PING) application latency, are key performance indicators (KPIs) for network operators. Therefore, reducing these latencies is important to improving the network operation. In one example step, the PING application latency can be optimized, and the transmission control protocol acknowledgment (TCP ACK) latency can be optimized in another example step, and the TCP ACK latency optimization will in turn increase the download speed, thereby providing a complete solution to the latency issue in the network. The present disclosure is focused on optimizing the PING latency issue.

Figure 1:
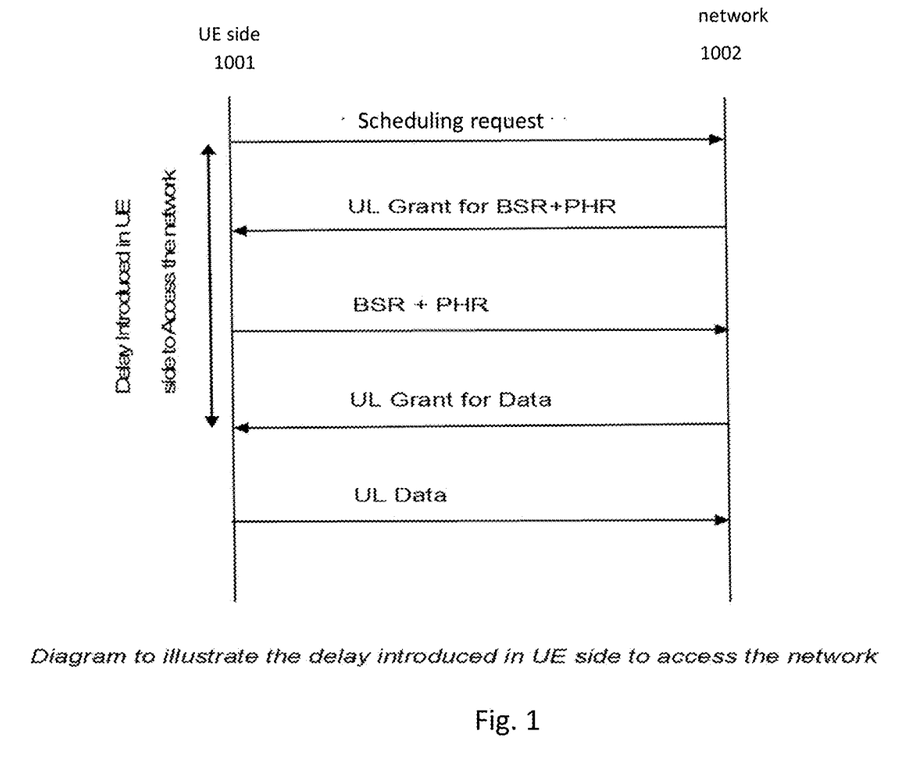
FIG. 1 illustrates the delay introduced in the UE side to access the network.

The PING latency issue is due to two factors: i) one factor is the user equipment (UE) time to access the network in uplink (UL) (by sending Scheduling Request (SR), uplink (UL) grant for Buffer Status Report+Power Headroom Report (BSR+PHR), followed by UL grant for transmission of UL Data); and ii) the second factor is due to the stale PHR (as there are no proactive allocations for inactive UEs for PHR transmissions). FIG. 1 illustrates the delay introduced in the UE side (shown as 1001) to access the network (shown as 1002).

Regarding the two factors described above, when there is no UL data transmission happening from a UE, the UE doesn't have a UL grant to request for more UL grants (e.g., to send a Packet Internet Grope (PING) Request) by sending a Buffer Status Report (BSR). Instead, the UE has to send a Scheduling Request (SR) in the Physical Uplink Control Channel (PUCCH) to get the UL grant to send the BSR, and this process introduces a delay in the UE side to access the network (to access the network as soon as possible once the PING Request is ready in the UE media access control (MAC) layer to be transmitted in the Air). In addition, the UL grant given by evolved node B (eNB) in response to SR is given without any recent PHR report (as there is no UL data transmissions in the air (i.e., over a wireless interface) during UL inactivity, typically the PHR reports are piggy-backed along with UL data transmissions by a UE when the UL data transmissions occur), so the Modulation and Coding Scheme (MCS) and transmit power command (TPC) for the UL grant needs to be conservative, as there is no exact information available from the UE to decide on this.

Known attempts to improve the PING latency issue are complex and not robust. For example, one known approach involves the following: i) determines whether the UE is carrying out PING according to a learning result; ii) determines a period of sending a data packet by the UE when determining that the UE is carrying out PING and carries out pre-scheduling according to the period; and iii) whether to carry out pre-scheduling in a later learning period is determined according to a learning result of a previous learning period. This approach, which is learning-window-based, is complex and requires multiple PINGs to learn and adapt. Therefore, there is a need for an improved technique for solving the PING latency issue.

SUMMARY OF THE DISCLOSURE

The present disclosure focuses on a method to reduce the network latency as measured using the PING application, thereby providing improved quality of experience (QoE) for network users.

In an example method according to the present disclosure, in order to reduce the PING latency, e.g., in 5G New Radio (NR) or LTE system, the example method is triggered only for user equipments (UEs) with uplink (UL) inactivity, i.e., Evolved Node B (eNodeB or eNB) missed at-least two or more Power Headroom Report (PHR) cycles (periods) from a UE. The example method reduces the PING latency by more than 11 ms when compared to existing 3GPP-standard-based UE network access schemes, with SR periodicity of 20 ms. In the case of High Capacity cells, the SR periodicity will be increased to support more capacity, e.g., the SR periodicity will go to 80 ms, which will increase the PING latency significantly, so the example method according to the present disclosure significantly reduces the PING latency in these scenarios.

In an example embodiment according to the present disclosure, when the first and second PING Requests are received from the UE in UL, UE will use the SR and BSR cycles to get the UL Grant, and starting from the third PING request, a proactive allocation window size of 2*SR periodicity/3, e.g., 2*20/3, will be provided, so there will be 11 proactive allocations spread across 33 of the transmission time intervals (TTIs), which is a unique way of sending proactive allocations.

In an example embodiment according to the present disclosure, the time estimation to find the PING request packet arrival is based on the time of receipt of the Scheduling Request (SR). In addition, in an example embodiment according to the present disclosure, the typical "proactive allocation window" (the number of the transmission time intervals (TTIs) over which the proactive allocations are given to UE) is set to 4, and subsequently the "proactive allocation window" may be adapted based on learning.

In an example embodiment according to the present disclosure, the latency reduction is achieved starting from the third PING request packet onwards.

In an example embodiment according to the present disclosure, for UL synchronized HARQ in LTE based systems, "HARQ Feedback" is addressed in the proactive allocation. In addition, error cases are addressed, e.g., when the data in proactive allocation is received with error. The above scenarios are similarly handled for 5G New Radio (NR) based systems also, for asynchronous UL HARQ.

DETAILED DESCRIPTION

UE-Initiated Ping Latency Reduction

In order to reduce the Packet Internet Grope (PING) latency, e.g., in 5G New Radio (NR) or LTE system, the following scheme is triggered only for user equipments (UEs) with uplink (UL) inactivity, i.e., eNodeB missed at-least two or more Power Headroom Report (PHR) cycles (periods) from a UE.

There are two components to this example embodiment of the method, "delay timer" and "proactive allocation window." The delay timer is to delay the start of the proactive allocation window from the transmission time interval (TTI) in which the packet type is detected, i.e., detected using IP header "Protocol" number field. The proactive allocation window is the number of TTIs over which the proactive allocations are given to a UE. For example, if there are 4 allocations continuously spread over 4 TTIs, then the proactive allocation window size is 4 TTIs. This proactive allocation window size and start time are tuned in each step (e.g., for each PING request received).

Figure 2:
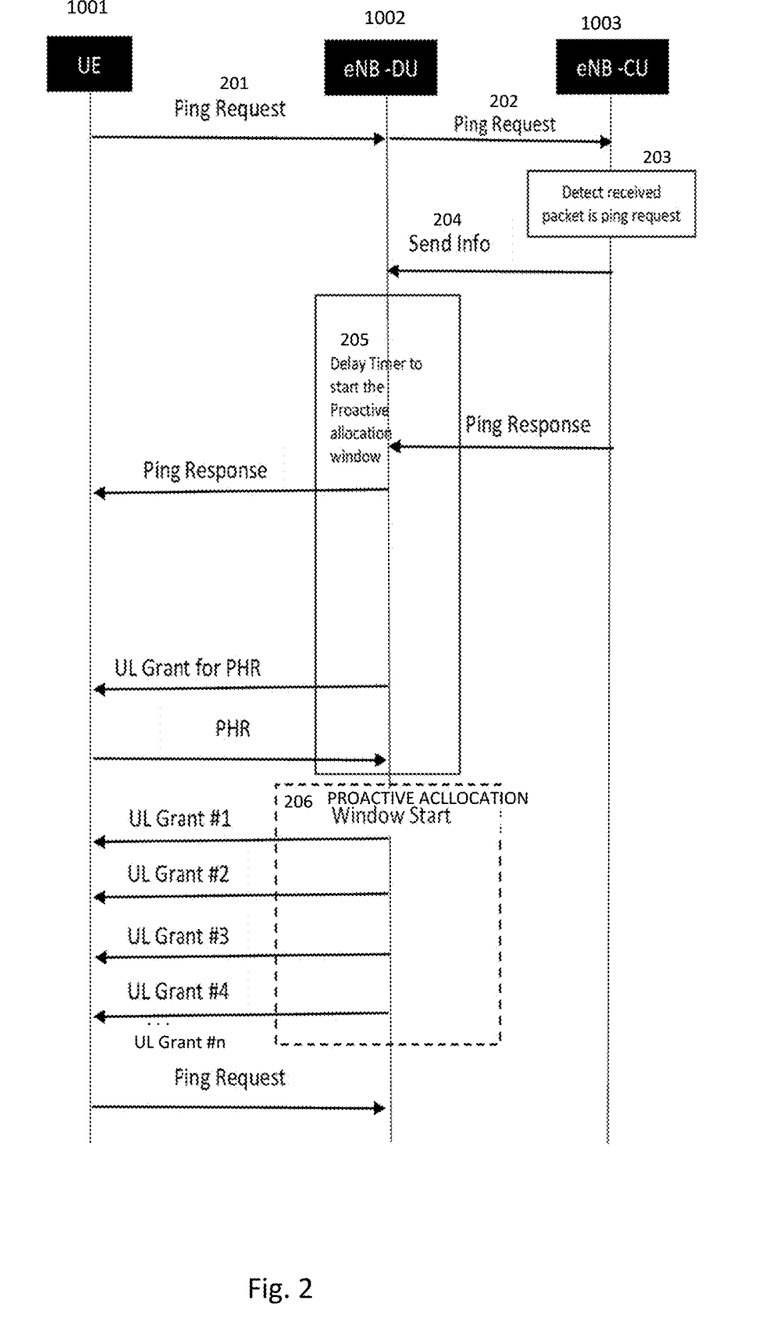
FIG. 2 an example embodiment of a method according to the present disclosure.

FIG. 2 is a process diagram illustrating an example embodiment of the PING latency reduction method according to the present disclosure. When the PING request arrives (process arrow 201) from the UE 1001 to the distributed unit's (eNB-DU 1002, also referred to as simply DU 1002) media access control (MAC) layer, the DU 1002 checks whether the UE 1001 has been inactive, and if so, the DU 1002 will i) store the Received System Frame Number (Received_SFN)/subframe number (Subframe_Num), which Received_SFN/Subframe_Num corresponds to the TTI in which the SR was received, and ii) indicate (process arrow 202) to the central unit's (eNB-CU 1003, also referred to as simply CU 1003) Packet Data Convergence Protocol (PDCP) to "detect the packet type" and "size" information, i.e., send the information (Info={Packet type, and size}). In the CU PDCP layer, after decryption, the type of the packet (e.g., PING request) is detected (box 203), by checking the IP header, and the size of the packet is found by checking the internet control message protocol (ICMP) payload. This information will be provided (process arrow 204) to DU 1002's MAC layer, along with Received_SFN/Subframe_Num, and the DU 1002's MAC Layer will note the TTI in which it received the CU 1003's transmitted information with Current_SFN/Subframe_Num.

In an example embodiment according to the present disclosure, the first and second PING requests (P1 and P2, respectively) from the UE 1001 will use SR, BSR and UL Grant sequence flow. The example embodiment of the method according to the present disclosure reduces the latency from the third PING request (P3) onwards. The TTIs in which the SR was received for the first and second PING requests (P1 and P2, respectively) will be noted in DU 1002, e.g., as Received_SFN #P1/Subframe_Num #P1 and Received_SFN #P2/Subframe_Num #P2.

In the case of a second PING request (P2) from the UE 1001, the proactive allocation window delay timer value is defined as follows:

$$\text{Delay Timer \#1} = (X1 - X2 - X3 - X4)$$

$$X1 = (\text{Received\_SFN \#P2/Subframe\_Num \#P2} - \text{Received\_SFN \#P1/Subframe\_Num \#P1})$$

$$X2 = (\text{Current\_SFN \#P2/Subframe\_Num \#P2} - \text{Received\_SFN \#P2/Subframe\_Num \#P2})$$

$$X3 = 2*(\text{UEAppToMACLayerDelay})$$

$$X4 = (2*\text{SR periodicity}) - ((2*\text{SR periodicity})*20/100))$$

For the sake of clarity, the parameter "(Received_SFN #P2/Subframe_Num #P2−Received_SFN #P1/Subframe_Num #P1)" will be referenced as "APPROX PING INTERVAL." The UEAppToMACLayerDelay, which represents the delay from the PING application (App) to the MAC Layer in the UE, can be, e.g., 2 ms, but this value can be tuned after testing.

The above-defined delay timer, DELAY TIMER #1, (note that box 205 in FIG. 2 can represent DELAY TIMER #1 through DELAY TIMER #n) will be started in DU 1002's MAC layer, after packet detection information is received from CU 1003's PDCP layer. This delay timer (DELAY TIMER #1) value represents an estimation to find the next PING interval in which the next PING request will occur, i.e., trying to estimate the time delays the first and second PING requests experienced in the UE and in the air (wireless) interface. In an example embodiment of the method according to the present disclosure, 20% of the time from the SR periodicity is deducted based on the assumption that PING requests #1 (P1) and #2 (P2) suffer 20% delay to access the SR occasion. For example, if the SR periodicity is 2*20 ms−8 ms=40 ms−8 ms=32 ms, we assume the UE experienced 4 ms (8 ms/2) delay to access the SR occasion.

The Received_SFN #P2 is the SFN/SF in which the SR for a second PING request (P2) is received from the UE 1001 in MAC layer and at the same time in the CU 1003's packet detection, if the packet is confirmed as a PING request. When the delay timer (DELAY TIMER #1, represented by box 205 in FIG. 2) ends, the corresponding proactive allocation window will be started (as shown by box 206 in FIG. 2), which proactive allocation window can include, e.g., 11 UL allocations (in FIG. 2, UL allocations are shown as UL Grants #1, 2, 3, 4 and n, so n=11 for the example case of 11 UL allocations for UL grants after DELAY TIMER #1). The 11 UL allocations correspond to SR periodicity/proactive allocation gap, e.g., 32 ms/3=11 UL allocations, each with three TTIs gap (or width), so the proactive allocation window will cover 33 TTIs (representing the window size) when the second PING request (P2) is received, and which proactive allocation window provides UL allocation to a third PING request (P3). The proactive allocation gap (3 in the above example) is referenced as PROACT_ALLOC_GAP_Win #1.

Each allocation will be of a size corresponding to a PING request payload. Once the PING request is received in one of the proactive allocations (among the 11 allocations, for example), the proactive allocation window will be stopped. The first proactive allocation window size in the example is of 11 UL grants (corresponding to a total of 33 TTIs). The reason for this is, if the SR periodicity is assumed to be, e.g., 20 ms, the occasion in which the UE sends an SR will be random within the period, i.e., at any moment starting from 0ms to 20 ms. Therefore, it can't be assumed that 20 ms will be the time at which the SR is received, i.e., such an assumption will not reduce the PING latency to full extent.

In the case of a third PING request (P3) received from the UE 1001, there will be a new delay timer (Delay Timer #2) for a proactive allocation window start, as defined below:

Delay Timer #2=$((X1+X2+X3)-X4)$ $X1$=(Received_SFN #P2/Subframe_Num #P2−Received_SFN #P1/Subframe_Num #P1)

$X2$=if (proactive-allocation-data-received-index==1) {PROACTIVE_ALLOCATION_GAP_Win #1}else{0}

$X3$=(Start Delay Offset(proactive-allocation-data-received-index−proactive-allocation-window-start-index))

$X4$=(Current_SFN #P3/Subframe_Num #P3−Received_SFN #P3/Subframe_Num #P3)

If the "proactive-allocation-data-received-index" is one, this means the UE 1001 is able to catch up to the first proactive allocation itself. In this case, the allocation window needs to be advanced further in an attempt to additionally reduce latency, i.e., the proactive allocation (PA) window is advanced further to "PROACTIVE_ALLOCATION_GAP_Win #1" offset to compensate for the 3 TTI gap that was incorporated in the PA Window #1.

When the delay timer (Delay Timer #2) ends, the corresponding proactive allocation window will be started. In an example embodiment of the method according to the present disclosure, there will be 4 continuous UL allocations in the proactive allocation window, i.e., the proactive allocation window will cover 4 TTIs (representing the window size).

The "Start Delay Offset" is to compensate for the timing mismatch between the first proactive allocation in the window and the actual proactive allocation in which the data is received. For example, if there are 10 proactive allocations in the window (spread across 20 TTIs), and the data (PUSCH) is actually received for the corresponding seventh allocation (DCI0), the delay timer needs to be advanced further by 14 TTIs (7*2) to sync with UE PING request timing. In the above example, DCI0 will be in the $14^{th}$ (7*2) TTI in the proactive allocation window, and PUSCH will be in 18th TTI in the window, so the "proactive-allocation-data-received-index"=14 (not 18), which takes care of the 4 TTI delay between DCI0 and PUSCH transmission, and the "proactive-allocation-data-received-index" variable points the UL grant (DCI0) index in the proactive allocation window, not the PUSCH.

In the case of a fourth PING request received from the UE, there will be a new delay timer (Delay Timer #3) for a proactive allocation window start, as defined below:

Delay Timer #3=$((X1+X2+X3)-X4)$ $X1$=(Received_SFN #P2/Subframe_Num #P2−Received_SFN #P1/Subframe_Num #P1)

$X2$=if (proactive-allocation-data-received-index==1) {PROACTIVE_ALLOCATION_GAP_Win #1}else{0}

$X3$=(Start Delay Offset(proactive-allocation-data-received-index−proactive-allocation-window-start-index))

$X4$=(Current_SFN #P4/Subframe_Num #P4−Received_SFN #P4/Subframe_Num #P4)

If the "proactive-allocation-data-received-index" is one, this means the UE is able to catch up to the first proactive allocation itself. In this case, the allocation window needs to be advanced further in an attempt to additionally reduce latency, i.e., the proactive allocation (PA) window is advanced further to "PROACTIVE_ALLOCATION_GAP_Win #1" offset to compensate for the 3 TTI gap that was incorporated in the PA Window #1.

The "Start Delay Offset" is to compensate for the timing mismatch between the first proactive allocation in the window and the actual proactive allocation in which the data is received. For example, if there are 4 proactive allocations in the window, and the data (PUSCH) is actually received for the corresponding third allocation (DCI0), the delay timer needs to be advanced further by two TTI to sync with UE PING request timing and reduce the window size to two. In the above example, DCI0 will be in the 3rd TTI in the proactive allocation window, and PUSCH will be in 7th TTI in the window, so the "proactive-allocation-data-received-index"=3 (not 7), which takes care of the 4 TTI delay between DCI0 and PUSCH transmission, and the "proactive-allocation-data-received-index" variable points the UL grant (DCI0) index in the proactive allocation window, not the PUSCH.

When a particular delay timer ends, the corresponding proactive allocation window will be started, and there will be "W" UL allocations in the window. All "W" allocations are continuous, so it will cover "W" TTIs (which represent the "window size"). The "W" value is indicated by "proactive-allocation-data-received-index," e.g., if the "proactive-allocation-data-received-index" value is 4, then the W size is 4.

This functionality to tune the delay timer and the window size will be repeated for all other subsequent PING request packets from the UE. In the next or subsequent PING request transmission occasion, the proactive allocation window size will become one, i.e., there will be only one proactive allocation which is matching with the UE PING request timing.

Figure 3:
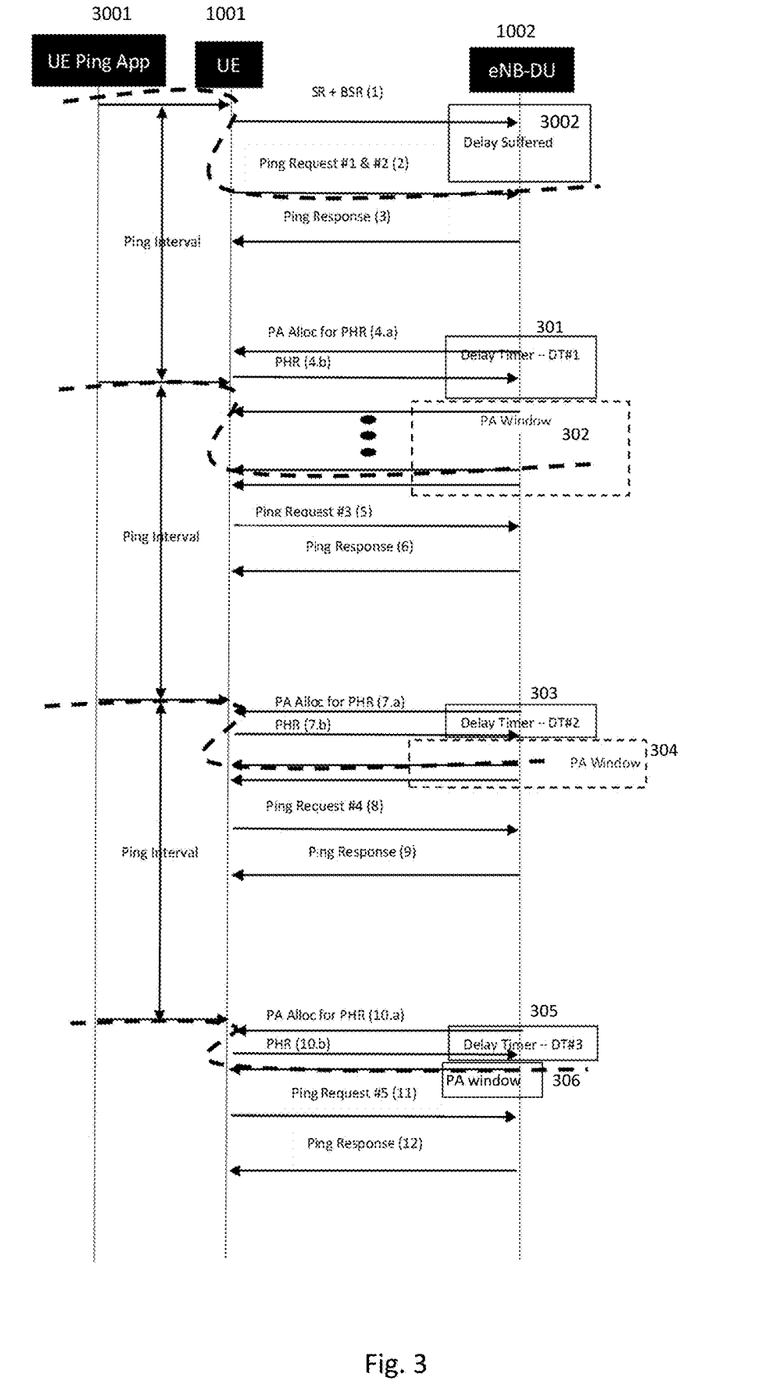
FIG. 3 illustrates and example embodiment of a method according to the present disclosure, including adaptation of a proactive allocation window and the number of allocations inside the proactive allocation window.

FIG. 3 illustrates the process flow for the above-described example embodiment of the method according to the present disclosure, including adaptation of a proactive allocation window and the number of allocations inside the proactive allocation window. The illustration shown in FIG. 3 overlaps with the illustration shown in FIG. 2. In Step 1, as referenced by the process arrows (1), (2) and (3) shown in FIG. 3, namely the process arrows designated "SR+BSR (1)", "PING Request #1 & #2 (2)", "PING Response (3)", the first and second PING requests from the UE will use SR, BSR and UL Grant sequence flow, and the TTIs in which the SR was received for the first and second PING requests will be noted in DU, e.g., as Received_SFN #P1/Subframe_Num #P1 and Received_SFN #P2/Subframe_Num #P2. The delay due to SR is illustrated as "delay suffered" in box 3002.

Next, in Step 2, the Delay Timer #1 is started (box 301) in the DU 1002's MAC layer, after packet detection information is received from CU PDCP layer. The process arrow (4.a), designated "PA Alloc. for PHR (4.a)", illustrates a proactive allocation from the DU 1002 to the UE 1001 for a PHR, and the process arrow (4.b), designated "PHR (4.b)", illustrates a PHR from the UE 1001 to the DU 1002, both (4.a) and (4.b) occurring before the start of the corresponding proactive allocation window (box 302). The process arrow (5) illustrates PING request #3 from the UE 1001 to the DU 1002, and the process arrow (6) illustrates the PING response from the DU 1002.

Continuing with FIG. 3, in Step 3, the Delay Timer #2 is started (box 303) in the DU MAC layer, and the process arrows (7.a), designated "PA Alloc. for PHR (7.a)", illustrates a proactive allocation from the DU 1002 to the UE 1001 for a PHR, and the process arrow (7.b), designated "PHR (7.b)", illustrates a PHR from the UE 1001 to the DU 1002, both (7.a) and (7.b) occurring before the start of the corresponding proactive allocation window (box 304), the size of which proactive allocation window has been reduced in comparison to the previous proactive allocation window (302). The process arrow (8) illustrates PING request #4 from the UE 1001 to the DU 1002, and the process arrow (9) illustrates the PING response from the DU 1002.

Next, in Step 4, the Delay Timer #3 is started (box 305) in the DU 1002's MAC layer, and the process arrows (10.a), designated "PA Alloc. for PHR (10.a)", illustrates a proactive allocation from the DU 1002 to the UE 1001 for a PHR, and the process arrow (10.b), designated "PHR (10.b)", illustrates a PHR from the UE 1001 to the DU 1002, both (10.a) and (10.b) occurring before the start of the corresponding proactive allocation window (box 306), the size of which proactive allocation window has been reduced (it is now just one allocation slot) in comparison to the previous proactive allocation window (304). The process arrow (11) illustrates PING request #5 from the UE 1001 to the DU 1002, and the process arrow (12) illustrates the PING response from the DU 1002.

At this point, the proactive allocation window size is set to 4 TTIs, because within the time that UE 1001 is not using the UL grant, there will be only one PING request (not a PING burst) from the UE 1001. In the case of a large PING packet size, e.g., 1024 bytes, the eNodeB can provide a proactive allocation of only half the size. In this case, there will be a minimum of two proactive allocations in the proactive allocation window, since the UE will segment the PING and send the segments in two TTIs using two proactive allocations.

Steps 1 through 4 explained above in connection with FIG. 3 will be repeated each time a PING burst starts. In case the UE does not provide a PING request, but instead provides an SR, the proactive allocation window ends. In the case of retransmission of a PING response (which means UE sent a NACK feedback), the proactive allocation window will not start.

As an example, if the maximum mid-haul delay is assumed to be 6 msec, it will take at least 7 msec to obtain the information in the MAC layer whether the packet is a PING request or not. When it is detected that the packet is a PING request in PDCP, the packet detection information is sent to the MAC, and by the time the PING response arrives at the CU (taking into account the backhaul latency and PING server response time), the packet detection information will be received at the MAC. The proactive UL allocation window is started after the PING response is received at the DU.

While detecting that the packet is a PING request in PDCP, the packet size of the PING request will also be determined. When the PING response arrives at the MAC, it can be determined whether the received response is a PING response or not, using the packet size information of the PING request and the packet size information of the PING response (alternatively, PING response can be also detected in the PDCP, which detected PING response information can be sent from the PDCP to the MAC, and by the time PING response arrives at the MAC, the information sent from the PDCP will also reach the MAC). Once it is determined whether the received response is a PING response or not, the proactive UL allocation window is ended.

The above-described example embodiment of the method according to the present disclosure utilizes the first and second PING requests from the UE to estimate the PING request packet data size which will be used to provide proactive allocations for the successive PING request UL grants.

Network Initiated Ping

Although the above-described example embodiment of the method according to the present disclosure has been described in the context of the UE-initiated PING scenario, the method according to the present disclosure is fully applicable to the network-initiated PING scenario. In the network-initiated PING scenario, instead of estimating the time of arrival (as reflected by delay timers in the method) of PING request in UL, the time of arrival of PING response will be estimated in UL, but the remaining core functionality will be the same for both scenarios.

Overcoming Stale PHR Issue (UE-Initiated Ping):

In an example embodiment of the method according to the present disclosure, the proactive UL allocation window (window size of 4 TTIs) starts after approximately (APPROX_PING_INTERVAL−x) following transmitting the PING response. Therefore, even before the proactive UL allocations delay timer ends, i.e., after transmitting the PING response in air and after (APPROX_PING_INTERVAL−x−offset(32)), a proactive UL allocation is provided in the next TTI as a one-time UL allocation for PHR transmission. The UE will use this one-time allocation to transmit PHR. The 32 TTIs=8 TTIs HARQ RTT*4 HARQ retransmissions, 8 TTIs are for DCI to PUSCH=4TTIs, PUSCH data to receive in eNodeB MAC layer=3 TTIs, and 1 TTI for headroom. Accordingly, when the PA window starts, PHR will be valid as it is only 32 TTIs old, in the worst case.

UE Reaction to Multiple Proactive Allocations

In case there are multiple allocations for the UE in the UL proactive allocation window and the UE is going to use only one (for example, out of 4 allocations, the UE chooses to use the fourth allocation grant), an example reaction of the UE for the other allocations is as follows: If there is no data in UE to send, then the UE will send padding data (with padding LCID) without BSR, and if it's a PHR occasion or the previous PHR occasion was missed, the UE will transmit the PHR.

HARQ Processes and Synchronous HARQ in UL (e.g., in LTE Based Systems):

In UL, synchronous HARQ is used, which means the same specific HARQ process is repeated in a specific subframe, i.e., UE must use the same HARQ process number every 8 subframes (FDD RTT).

Example Case #1: All the proactive allocations in the allocation window will have DCI0 with RV0, so that eNB will not do the HARQ soft combining by mistake, e.g., when UE retransmits padded data due to wrong HARQ feedback decoding. In addition, eNB will not send NACK for the padded data sent by UE (with error) in the proactive allocation window.

Example Case #2: For the second and third proactive allocation windows in a PING burst, in the case of 4 allocations provided in each of these proactive allocation windows, if the padding data transmitted by UE in any one allocation is in CRC error, and the eNB has already received the intended PING request before the actual subframe in which the synchronous retransmission happens, then the eNB will not send NACK. For example, if the padding data in the first allocation (Alloc #1) in the allocation window is in CRC error, and i) the padding data continue to be received in the second and third allocations (Alloc #2 and Alloc #3) in the allocation window without BSR, and ii) in the fourth allocation (Alloc #4) the expected user data is received, then the eNB will send ACK as HARQ feedback. This is possible because the feedback for the Alloc #1 will be sent in the 8th subframe, by which time it is possible to decode the Alloc #4 and determine whether the expected user data is received or not.

Example Case #3: In the case of 4 allocations provided in the proactive allocation window, if the UE i) sends the padded data in the Alloc #1, ii) sends in Alloc #2 the actual data which is in CRC error, and iii) sends Alloc #3 and Alloc #4 with padded data, then the eNB will not be able to know whether the PUSCH received in Alloc #2 is padded data or the actual data. In this case, the window size will not be extended, thereby allowing the UE to recover from the error, send an SR and transmit a PING request. This applies for all cases where one PUSCH (allocation) is in error out of four UL grants, and the remaining three are received successfully with padded data.

Example Case #4: This case is substantially similar to the Example Case #2, with the only differences being that the UE not able to catch up with the window size (4 allocations), and the last allocation is also padding data without BSR. This scenario is possible because, for Alloc #1 and Alloc #4, feedback will be sent in the 8th and 12th subframes, respectively, by which time it is possible to decode Alloc #4 and determine whether the expected user data is received or not, and send ACK as HARQ feedback for the padded data.

Example Case #5: In the case of 4 allocations provided in the proactive allocation window, if the data in all 4 allocations are in error, eNB will not be able to determine whether expected user data in one of the proactive allocations is in error. In this case, the window size will not be extended, thereby allowing the UE to recover from the error, send an SR and transmit a PING request.

Example Case #6: Example Case #1 to Example Case #5 are valid for the first proactive allocation window (containing 11 allocations).

5G NR vs. LTE

The example embodiment of the method according to the present disclosure is fully applicable to, e.g., 5G NR and LTE, as well as other standards. In the context of the method according to the present disclosure, there are two relevant techniques which are different in 5G NR compared to LTE: one is SR, and the other one is HARQ. The below-described changes to SR and HARQ refer to the changes needed for the 5G NR operation.

With respect to Scheduling Request (SR) in 5G NR, due to the multiple numerology/TTI type and the associated logical channel, changes in SR is required. The MAC entity can be configured with zero, one, or more SR configurations. An SR configuration consists of a set of PUCCH resources for SR across different BWPs and cells. For a logical channel, at most one PUCCH resource for SR is configured per BWP. Each SR configuration corresponds to one or more logical channels.

With respect to Code Block Group (CBG)-based HARQ feedback and re-transmissions, it should be noted that there can be a performance degradation of HARQ due to large TB size, and CBG-based feedback and re-transmissions are introduced to overcome the performance degradation. In the channel coding phase in the physical layer, code block segmentation and code block concatenation can be implemented in an example embodiment. The mobile terminal will send HARQ feedback for each of the individual groups of CBGs, and this granular level of feedback mechanism avoids the overhead of re-transmitting the large TB multiple times, which improves the spectral efficiency. In this manner, multiple-bits HARQ feedback is introduced to provide a feedback to multiple CBGs. Even the re-transmissions are of code block granularity. This CBG-based re-transmission and feedback feature is configurable and adaptive, i.e., for a small TB size the method according to the present disclosure can revert to the regular scheme.

With respect to UL HARQ, it should be noted that asynchronous and adaptive UL HARQ is supported in 5G NR, i.e., it functions with the multiple HARQ processes in any order, and there is no stipulated relationship between a specific HARQ process number a specific subframe. To keep track of each HARQ process even when multiple HARQ processes are not running in order, the sender and the receiver in the HARQ process should know the exact HARQ process number for each transmission/reception of the HARQ data. For this, DCI carries a field called HARQ Processor number. In 5G NR, both Downlink Scheduling DCI and Uplink Scheduling DCI carries the field HARQ Processor Number since they both use asynchronous HARQ.

In addition, there is no explicit HARQ ACK/NACK for PUSCH, and basically there is no PHICH channel. If gNB does not send a retransmission request for a certain period of time, UE assumes that PUSCH is successfully received and decoded by gNB. In this manner, UE figures out the PUSCH status based on whether it gets a retransmission request from gNB or not.

Applicability to 5G NR

As mentioned above, the example embodiment of the method according to the present disclosure is fully applicable to, e.g., 5G NR, albeit with some modifications. In this section, each one of the modifications specific to 5G NR application as described above will be further explained in terms of how much (if any) impact the modifications will have on the example embodiment of the method. First, the SR-related changes in 5G NR will not impact the example embodiment of the method according to the present disclosure. The UE needs to send the SR to access the network in UL, and this introduces the delay as previously discussed above. Second, the CBG-based feedback and re-transmission will have an impact on the example method according to the present disclosure. Once the packet is received with an error, the CBG-based feedback and re-transmission will be utilized. In this implementation, if the PUSCH received in the proactive allocation window is received with an error, then the eNB will react in a different way, and the corresponding gNB functionality will be defined as described below. Third, asynchronous UL HARQ and no feedback for PUSCH will have an impact on the example method according to the present disclosure, and the relevant changes are described below.

In UL, asynchronous HARQ is used in 5G NR, and described below are various scenarios in which the 5G NR system handles asynchronous HARQ.

Example Case #1: All the proactive allocations in the window will have DCI 0_0/0_1 with RV0, so that gNB will not do the HARQ soft combining by mistake. In addition, gNB will not send DCI0_0/0_1 with retransmission for the padded data sent by UE with error in the proactive allocation window.

Example Case #2: In the case of a proactive allocation window with 4 allocations, if the padding data transmitted by UE in any one of these allocations is in CRC error, and the gNB has already received the intended PING Request before the actual subframe in which the intended retransmission is supposed to be triggered by the gNB, then the gNB will not trigger the retransmission for that PUSCH. As an example, if i) the padding data in the first allocation (Alloc #1) in the allocation window is in CRC error, ii) the padding data in the second and third allocations (Alloc #2 and Alloc #3) in the allocation window are received without BSR, and iii) in the fourth allocation (Alloc #4) in the allocation window the expected user data is received, then the gNB will not retransmit the Alloc #1. This is possible because, for the Alloc #1, the timing of sending the trigger for retransmission depends on K2 parameter indicated in DCI, e.g., it can be the 8th subframe, by which time we can decode the Alloc #4 and determine whether the data is expected user data or not.

Example Case #3: In the case of a proactive allocation window with 4 allocations, if i) the UE sends the padded data in the first allocation (Alloc #1) within the allocation window, ii) in the second allocation (Alloc #2) within the allocation window the actual data is sent which is in CRC error, and iii) the third and fourth allocations (Alloc #3 and Alloc #4) within the allocation window are sent with padded data, the gNB will not be able to determine whether the PUSCH received in Alloc #2 is padded data or the actual data. In this case, the window size will not be extended, thereby allowing the UE to recover from the error and send an SR and transmit a PING Request. This applies for all cases in which one PUSCH (Allocation) is in error out of four UL grants (allocations), and the remaining three UL grants (allocations) are received successfully with padded data.

Example Case #4: This case is substantially similar to the Example Case #2, with the only differences being that the UE not able to catch up with the window size (4 allocations), and the last allocation is also padding data without BSR. This scenario is possible because, for Alloc #1 and Alloc #4, the timing of the sending of the retransmission trigger depends on K2 parameter indicated in DCI, e.g., it can be the 8th and 12th subframes, respectively, by which time Alloc #4 can be decoded and determined whether the expected user data is received or not, and declare the padded data is successfully received.

Example Case #5: In the case of 4 allocations provided in the proactive allocation window, if the data in all 4 allocations are in error, gNB will not be able to determine whether expected user data in one of the proactive allocations is in error. In this case, the window size will not be extended, thereby allowing the UE to recover from the error, send an SR, declare all four PUSCHs are successful, and there will be no triggering of the retransmit DCI.

Outer Loop Rate Control (OLRC) Optimization

In an example embodiment of the method according to the present disclosure, when a padding data is received in the proactive allocation, the ACK response is not updated in the OLRC Step Up calculation. This is necessary because even for padding data with an error, the example embodiment of the method provides an ACK response instead of a NACK response, to reset the HARQ Process status to new. This is valid for the cases in which the data in all 4 proactive allocations are in error.

In another example embodiment of the method according to the present disclosure, if the intended data packet is received in the proactive allocation, HARQ process status and OLRC are active, and the ACK/NACK response will be updated in the OLRC Step Up and Step Down calculation. This is not valid for the cases in which the data in all 4 proactive allocations are in error.

UL Data During Active Delay Timer/Proactive Allocation

If UL data (any data traffic) arrives in the UE MAC layer when the delay timer is running, UE sends the SR/BSR flow to get the UL allocation to transmit the data. The delay timer will run its course and end. In the case the UE sends the BSR instead of a PING request in the proactive allocation, the proactive allocation window will be stopped. If i) UL data (any data traffic) arrives when the proactive allocation window is running, and ii) the UE sends the BSR instead of a PING request in the proactive allocation, the proactive allocation window will be stopped.

PING & UL Traffic

This section describes what happens when the PING is started when UL traffic is going on, and continues even after the UL traffic has stopped. In the case of PING request transmission during UL traffic flow (PING or any other traffic), UE will send BSR in the UL grant given to the UL traffic flow and get the UL grant for the PING request transmission. In the case of a PING request transmission when the UL traffic flow has stopped, for two PHR cycles there will not be any proactive allocation, and the UE will be using SR/BSR flow to get the UL grant. Thereafter, the UE will be identified as UL-inactive UE (when two or more PHR cycles are missed), and the PING latency reduction scheme embodied in the example method according to the present disclosure will be implemented.

Application to High Capacity Cells and Busy Hours

This section describes how an example embodiment of the method according to the present disclosure is applied to high capacity cells (e.g., 1,000 Radio Resource Control (RRC) Connected UEs) and during busy/non-busy hours for the cells. In the case of the cell PRB utilization being high (or during busy hours), the proactive allocation for the UE need not be supported to reduce the PING latency, but instead alert the UE that the cell is highly loaded (and let the PING latency increase). In the case of the cell PRB utilization being low (or during non-busy hours), the proactive allocation for the UE can be supported to reduce the PING latency.

In summary, the above-described example embodiments provide various advantages as outlined below:

A first example method for reducing Packet Internet Grope (PING) latency by estimating a time of PING request packet arrival in one of a 5G New Radio (NR) and a Long Term Evolution (LTE) system, comprising:
at least one of:
i) for a second PING request (P2) received from a user equipment (UE) following a first PING request (P1) received from the UE, estimating a first delay timer (Delay Timer #1) corresponding to anticipated occurrence of a third PING request, wherein Delay Timer #1=(X1−X2−X3−X4), $X1$=(Received_SFN #$P2$/Subframe_Num #$P2$−Received_SFN #$P1$/Subframe_Num #$P1$), $X2$=(Current_SFN #$P2$/Subframe_Num #$P2$−Received_SFN #$P2$/Subframe_Num #$P2$), $X3$=2*(UEAppToMACLayerDelay).

$X4$=(2*SR periodicity)−((2*SR periodicity)*20/100));

ii) for the third PING request (P3) received from the UE following the second PING request received from the UE, estimating a second delay timer (Delay Timer #2)

corresponding to anticipated occurrence of a fourth PING request, wherein Delay Timer #2=((X1+X2+X3)−X4), X1=(Received_SFN #P2/Subframe_Num #P2−Received_SFN #P1/Subframe_Num #P1), X2 equals PROACTIVE_ALLOCATION_GAP_Win #1 if proactive-allocation-data-received-index equals one, otherwise X2 equals zero, X3=(Start Delay Offset(proactive-allocation-data-received-index−proactive-allocation-window-start-index)), X4=(Current_SFN #P3/Subframe_Num #P3−Received_SFN #P3/Subframe_Num #P3); and iii) for the fourth PING request (P4) received from the UE following the third PING request received from the UE, estimating a third delay timer (Delay Timer #3) corresponding to the anticipated occurrence of the next PING request, wherein Delay Timer #3=((X1+X2+X3)−X4), X1=(Received_SFN #P2/Subframe_Num #P2−Received_SFN #P1/Subframe_Num #P1), X2 equals PROACTIVE_ALLOCATION_GAP_Win #1 if proactive-allocation-data-received-index equals one, otherwise X2 equals zero, X3=(Start Delay Offset(proactive-allocation-data-received-index−proactive-allocation-window-start-index)), X4=(Current_SFN #P4/Subframe_Num #P4−Received_SFN #P4/Subframe_Num #P4);

wherein SFN represents system frame number, Subframe_Num represents subframe number, UEAppToMACLayerDelay represents delay from the PING application (App) to the MAC Layer in the UE, and SR represents scheduling request.

A second example method for reducing Packet Internet Grope (PING) latency in one of a 5G New Radio (NR) and a Long Term Evolution (LTE) system, comprising:

for a second PING request received from a user equipment (UE) following a first PING request received from the UE, performing the following:

estimating a first delay timer (Delay Timer #1) corresponding to anticipated occurrence of a third PING request; and at the end of the first delay timer, starting a first proactive allocation window containing at least one uplink (UL) grant for the third PING request, wherein the number of UL allocations contained in the first proactive allocation window is defined as a ratio of Scheduling Request (SR) period over proactive allocation gap.

An example method according to the second example method, wherein the first proactive allocation window contains 11 UL allocations for the third PING request, each UL allocation having three Transmit Time Intervals (TTIs) gap (or width), whereby the size of the first proactive allocation window is 33 TTIs.

An example method according to the first example method, wherein the proactive allocation window size is adapted based on learning using the Start Delay Offset parameter in connection with at least one of the second delay timer (DelayTimer #2) and Nth delay timer (DelayTimer #N), N>2, the Start Delay Offset parameter compensating for a timing mismatch between a first proactive allocation slot of the proactive allocation window and an actual proactive allocation slot of the proactive allocation window in which the data is received, whereby at least one of the second delay timer (DelayTimer #2) and the Nth delay timer (DelayTimer #N) is added with the Start Delay Offset parameter.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

each proactive allocation slot in the proactive allocation window has DCI0 with RV0, whereby the eNB at least one of i) does not perform the HARQ soft combining by mistake when the UE retransmits padded data due to wrong HARQ feedback decoding, and ii) does not send a Negative Acknowledgement (NACK) for padded data sent by the UE with an error in the proactive allocation window.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if padding data transmitted by the UE in any one of the four proactive allocation slots is in Cyclic Redundancy Check (CRC) error, and the eNB has already received an intended Packet Internet Grope (PING) request before a subframe in which synchronous retransmission occurs, then the eNB does not send a Negative Acknowledgement (NACK).

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Packet Internet Grope (PING) request.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:

in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the eNB sends Acknowledgement (ACK) as HARQ feedback for the padding data.

An example method according to the first example method, wherein the method is applied to a Long Term Evolution (LTE) system using synchronous Hybrid Automatic Repeat Request (HARQ) in uplink (UL), and wherein to control Medium Access Control (MAC) layer HARQ feedback transmission from Evolved NodeB (eNB) to the user equipment (UE), the following is performed:
  in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR) and c) transmit a Packet Internet Grope (PING) request.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
  each proactive allocation slots in the proactive allocation window has DCI 0_0/0_1 with RV0, whereby the gNB i) does not perform HARQ soft combining by mistake, and ii) does not send DCI 0_0/0_1 with any retransmission for any padded data sent by the UE with error in the proactive allocation window.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
  in the case of four proactive allocation slots provided in the proactive allocation window, if padding data transmitted by UE in any one of the four proactive allocation slots is in Cyclic Redundancy Check (CRC) error, and the gNB has already received an intended Packet Internet Grope (PING) request before a subframe in which intended asynchronous retransmission is to be triggered by the gNB, then the gNB does not trigger the retransmission for a corresponding Physical Uplink Shared Channel (PUSCH).

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
  in the case of four proactive allocation slots provided in the proactive allocation window, if the UE i) sends padding data in the first proactive allocation slot (Alloc #1) provided in the proactive allocation window, ii) sends in the second proactive allocation slot (Alloc #2) provided in the proactive allocation window the actual data which is in Cyclic Redundancy Check (CRC) error, and iii) sends padding data in the third and fourth proactive allocation slots (Alloc #3 and Alloc #4) provided in the proactive allocation window, then the proactive allocation window size is not extended, thereby allowing the UE to at least one of a) recover from the CRC error, b) send a Scheduling Request (SR) and c) transmit a Packet Internet Grope (PING) Request.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
  in the case of four proactive allocation slots provided in the proactive allocation window, if at least one of i) padding data transmitted by UE in any one of the four proactive allocation slots is in Cyclic Redundancy Check (CRC) error, ii) the UE is not able to catch up with the proactive allocation window size, and iii) padding data is transmitted in the fourth proactive allocation slot (Alloc #4) provided in the proactive allocation window without Buffer Status Report (BSR), then the gNB at least one of a) determines whether the data transmitted in the fourth proactive allocation slot is user data, and b) declares the padded data transmitted in the fourth proactive allocation slot is successful.

An example method according to the first example method, wherein the method is applied to a 5G New Radio (NR) system using asynchronous Hybrid Automatic Repeat Request (HARQ) in uplink (UL), and wherein to control Medium Access Control (MAC) layer HARQ retransmission trigger from Next generation nodeB (gNB) to the user equipment (UE), the following is performed:
  in the case of four proactive allocation slots provided in the proactive allocation window, if all four proactive allocation slots are in Cyclic Redundancy Check (CRC) error, the proactive allocation window size is not extended, thereby allowing the UE to at least one of a) recover from the CRC error, b) send a Scheduling Request (SR), and c) not trigger retransmit Downlink Control Information (DCI).

An example method according to the first example method, further comprising:
  adapting Outer Loop Rate Control (OLRC) algorithm by performing the following:
  in the case of four proactive allocation slots provided in the proactive allocation window, at least one of i) if all four proactive allocation slots are in Cyclic Redundancy Check (CRC) error, and if a padding data is received in at least one of the proactive allocation slots, then not update the Acknowledgment (ACK) response in the OLRC Step Up calculation, and ii) if intended data packet is received in at least one of the proactive allocation slots, and Hybrid Automatic Repeat Request (HARQ) process status and OLRC are active, then update the ACK and Negative Acknowledgment (NACK) responses in the OLRC Step Up and Step Down calculations.

An example method according to the first example method, further comprising:
  advancing the Delay Timer #1 by 20% of SR periodicity.

An example method according to the first example method, wherein:
  if proactive-allocation-data-received-index equals 1, advancing at least one of the second proactive allocation window and the third proactive allocation window to PROACT_ALLOC_GAP_Win #1 offset.

Glossary of Terms

ACK—Acknowledgement
ACK SN—Acknowledgement Sequence Number
AM—Acknowledgement Mode
App—Application
BO—Buffer Occupancy
BSR—Buffer Status Report
BWP—Bandwidth Part
CBG—Code Block Groups
CRC—Cyclic Redundancy Check
CU—Centralized Unit
DCI—Downlink Control Information
DL—Downlink
DU—Distributed Unit
eNB—Evolved NodeB
gNB—Next generation nodeB
HARQ—Hybrid Automatic Repeat Request
ICMP—Internet Control Message Protocol
IP—Internet Protocol
KPI—Key Performance Indicator
L3—Layer-3
LCID—Logical Channel Identifier
LTE—Long Time Evolution
MAC—Medium Access Control
MCS—Modulation and Coding Scheme
NACK—Negative Acknowledgement
NR—New Radio
OLRC—Outer Loop Rate Control
PA—Proactive Allocation
PDCP—Packet Data Convergence Protocol
PDSCH—Physical Downlink Shared Channel
PDU—Protocol Data Unit
PHR—Power Headroom Report
PING—Packet Internet Grope
PRB—Physical Resource Block
PUCCH—Physical Uplink Control Channel
PUSCH—Physical Uplink Shared Channel
QoE—Quality of Experience
RLC—Radio Link Control
RTT—Round Trip Time
RV—Redundancy Version
SF—Subframe Number
SFN—System Frame Number
SR—Scheduling Request
TCP—Transmission Control Protocol
TCP ACK—Transmission Control Protocol Acknowledgement
TB—Transport Block
TPC—Transmit Power Control
TTI—Transmit Time Interval
UDP—User Datagram Protocol
UE—User Equipment
UL—Uplink

What is claimed is:

1. A method for reducing Packet Internet Grope (PING) latency in one of a 5G New Radio (NR) or a Long Term Evolution (LTE) system, comprising:
for a second PING request received from a user equipment (UE) following a first PING request received from the UE, performing the following by a distributed unit (DU) of the one of the 5G NR or the LTE system:
estimating a first delay timer (Delay Timer #1) corresponding to anticipated occurrence of a third PING request; and
at the end of the first delay timer, starting a first proactive allocation window containing at least one uplink (UL) grant for the third PING request, wherein the first proactive allocation window contains 11 UL allocations for the third PING request, each UL allocation having three Transmit Time Intervals (TTIs), whereby the size of the first proactive allocation window is 33 TTIs.

* * * * *